(12) United States Patent
Lin et al.

(10) Patent No.: US 12,204,707 B1
(45) Date of Patent: Jan. 21, 2025

(54) TOUCH PAD STRUCTURE CAPABLE OF DISPLAYING PATTERNS

(71) Applicant: Y.LIN ELECTRONICS CO., LTD., Guangdong (CN)

(72) Inventors: Qicheng Lin, Guangdong (CN); Guoliang Qiu, Miaoli County (TW); Hongrui Wu, Guangxi (CN); Zhichao Ye, Guangdong (CN)

(73) Assignee: Y.LIN ELECTRONICS CO., LTD., Dongguan (CN)

(*) Notice: Subject to any disclaimer, the term of this patent is extended or adjusted under 35 U.S.C. 154(b) by 0 days.

(21) Appl. No.: 18/824,893

(22) Filed: Sep. 4, 2024

(30) Foreign Application Priority Data

Jul. 11, 2024 (CN) .......................... 202410930376.6

(51) Int. Cl.
| | |
|---|---|
| *G06F 3/0354* | (2013.01) |
| *F21V 23/04* | (2006.01) |
| *F21V 8/00* | (2006.01) |
| *F21Y 115/10* | (2016.01) |

(52) U.S. Cl.
CPC ...... *G06F 3/03547* (2013.01); *F21V 23/0471* (2013.01); *F21V 2200/20* (2015.01); *F21Y 2115/10* (2016.08); *G02B 6/0011* (2013.01)

(58) Field of Classification Search
CPC ............... G06F 3/03547; G06F 3/0354; F21V 23/0471; F21V 23/0442; F21V 2200/00; F21V 2200/20; F21Y 2115/10; G02B 6/00; G02B 6/0011; G02B 6/0075; G02B 6/0078; G02B 6/0045; G02B 6/0046; G02B 6/0028; G02F 1/133615
See application file for complete search history.

(56) References Cited

U.S. PATENT DOCUMENTS

| | | | |
|---|---|---|---|
| 11,941,216 B1* | 3/2024 | Wu | G06F 3/0416 |
| 2004/0207605 A1* | 10/2004 | Mackey | G06F 3/042 |
| | | | 345/173 |
| 2018/0292595 A1* | 10/2018 | Lv | G02B 6/005 |
| 2019/0369767 A1* | 12/2019 | Lin | G06F 3/0412 |

* cited by examiner

*Primary Examiner* — Bao Q Truong

(57) ABSTRACT

Disclosed is a touch pad structure capable of displaying patterns. A touch assembly is arranged on a top surface of a printed circuit board (PCB), and light emitting diode (LED) lamps are arranged on the top surface of the PCB; two sets of LED lamps are arranged at a first end and a second end of the touch assembly respectively; light guide plates are arranged between the two sets of LED lamps, the light guide plates are arranged on an upper side of the touch assembly, and two sets of LED lamps have light emitting surfaces and performing forward lighting or side lighting; and when a spacing between two adjacent light guide plates is less than or equal to preset optical crosstalk spacing, the surface, facing the adjacent light guide plate, of each light guide plate is inclined, and film paper is mounted on the light guide plate.

9 Claims, 5 Drawing Sheets

TOUCH PAD STRUCTURE CAPABLE OF DISPLAYING PATTERNS

CROSS REFERENCE TO RELATED APPLICATIONS

The present application claims the benefit of Chinese Patent Application No. 202410930376.6 filed on Jul. 11, 2024, the contents of which are incorporated herein by reference in their entirety.

TECHNICAL FIELD

The present disclosure relates to the field of touch display devices, and in particular to a touch pad structure capable of displaying patterns.

BACKGROUND

Existing large household appliances, small household appliances, smart home devices, industrial control equipment, and 3C appliances, such as rice cookers, soup cookers, range hoods, disinfection cabinets, dishwashing cabinets, and microwave ovens, are configured with corresponding display screens/LED lamp sets and keys or touch display screens to achieve corresponding human-computer interaction control functions.

An LED lamp set, a backlight board, a pattern film and a key module constitute a traditional display interaction system. When the system is in use, all patterns are lit up by the backlight board and LED lamps, and function identification is realized by switching different LED lamps for constant lighting or flashing.

A display interaction system composed of a resistive touch screen or a capacitive touch screen includes: 1. a system only capable of displaying patterns in a preset pattern film, which is mostly used for middle and low-end electrical appliances, and has relatively low cost; and 2. a system with the function of displaying patterns and characters actively by configuring a display screen with a certain resolution, without need of relying on the preset pattern film, which is mostly used for high-end electrical appliances, and has relatively high cost.

Modules of the above two systems all need relatively deep mounting grooves, and both the two systems have disadvantages. The first system has the following advantages: in a bright environment, users rely on brightness to determine a functional status, thereby easily causing erroneous determination. Disadvantages of the second system mainly lie in relatively high cost and relatively more complex drive control. Moreover, the above two systems are generally based on serial peripheral interface (SPI) communication to achieve data interaction, which have high requirements on basic chip performance, requiring specific display driver chips.

Therefore, there is an urgent need for a touch pad structure capable of displaying patterns and solving one or more of the above problems.

SUMMARY

In order to solve one or more problems in the prior art, the present disclosure provides a touch pad structure capable of displaying patterns. The technical solution employed by the present disclosure to solve the above problems is as follows: a touch pad structure capable of displaying patterns includes a printed circuit board (PCB), where a touch assembly is arranged on a top surface of the PCB, and the touch assembly is electrically connected to an internal circuit of the PCB. Light emitting diode (LED) lamps are arranged on the top surface of the PCB, the LED lamps are electrically connected to the internal circuit of the PCB, and the touch assembly is of a capacitive touch module or a resistive touch module.

Two sets of LED lamps are arranged at a first end and a second end of the touch assembly respectively and form a set of controllable light sources, and the first end is opposite to the second end.

In the set of controllable light sources, light guide plates are arranged between the two sets of LED lamps, the light guide plates are arranged on an upper side of the touch assembly, and the two sets of LED lamps are provided with light emitting surfaces facing the light guide plates and performing forward lighting or side lighting.

When a spacing between two adjacent light guide plates is less than or equal to preset optical crosstalk spacing, the surface, facing the adjacent light guide plate, of each light guide plate is an inclined surface, and the inclined surface gradually narrows towards the direction of the touch assembly. Film paper is mounted on an upper surface of the light guide plate.

In some embodiments, a filler is arranged between the film paper and the PCB, and the filler is of a plastic bracket or foam or any other insulating material.

For example, the filler is of the plastic bracket and fixes the light guide plate in a limited manner.

In some embodiments, when the spacing between two adjacent light guide plates is less than or equal to the preset optical crosstalk spacing, a blocking plate is arranged between the two adjacent light guide plates, and the blocking plate is used for preventing optical crosstalk.

In some embodiments, when the spacing between two adjacent light guide plates is less than or equal to the preset optical crosstalk spacing, a shielding layer or a reflective layer is arranged on the surface, facing the adjacent light guide plate, of each light guide plate.

In some embodiments, the film paper pasted/adhered to an upper surface of the light guide plate, and the film paper is any one or combination of a semi-permeable film, a color film and a full-permeable color film.

In some embodiments, a diffusion sheet is mounted on the light guide plate to increase uniformity of light. Further, the capacitive touch module may be a conductive sheet, such as a conductive film sheet made of copper foil, aluminum foil, silver foil or a conventional composite material.

The present disclosure has the technical effects as follows: the capacitive or resistive touch module is selected according to needs, so as to flexibly deploy the touch assembly. The capacitive touch module is configured with copper foil. In use, a user touches the above touch pattern, an electric field at a position of the copper foil will be changed, and a micro-controller unit (MCU) executes corresponding actions by acquiring the change of an electric field signal, such as activation, inactivation and switching of a certain function. Each piece of copper foil is equivalent to a key, and finally backlight of the touch pattern can be turned on or off separately. This monitoring and control process does not require configuration of additional driver chips or driver circuits, which is simpler and more cost-effective than conventional screen driving.

In terms of structure, compared with the conventional screen, the touch pad structure can be made thinner. By configuring background color of the light guide plate and color of the film paper (semi-permeable film), all touch patterns can be hidden in a non-backlight state (an identification text corresponding to the copper foil position is not hidden). In a backlight state, only the corresponding touch pattern is lit up, and other touch patterns are still in the hidden state, so as to improve a recognition degree of the user to the currently displayed touch pattern in a strong lighting environment.

Further, the inclined surface cooperates with the blocking plate, the shielding layer or the reflective layer to further reduce optical crosstalk between the adjacent light guide plates, and improve a display effect and a hiding effect of the touch patterns.

REFERENCE NUMERALS

1. printed circuit board (PCB); 10. touch assembly; 2. light emitting diode (LED) lamp; 20. light emitting surface; 3. light guide plate; 30. inclined surface; 4. filler; 5. film paper; and 6. blocking plate.

DETAILED DESCRIPTIONS OF THE EMBODIMENTS

To enable the objectives, features, and advantages mentioned above of the present disclosure to be more apparent and easily understood, particular embodiments of the present disclosure will be described in detail below in combination with the accompanying drawings. Many specific details are set forth in the following description to facilitate full understanding of the present disclosure. However, the present disclosure may be implemented in many other ways different from those described herein, similar improvements may be made by those skilled in the art without departing from the connotation of the present disclosure, and therefore the present disclosure is not limited by the specific embodiments disclosed below.

Figure 1:
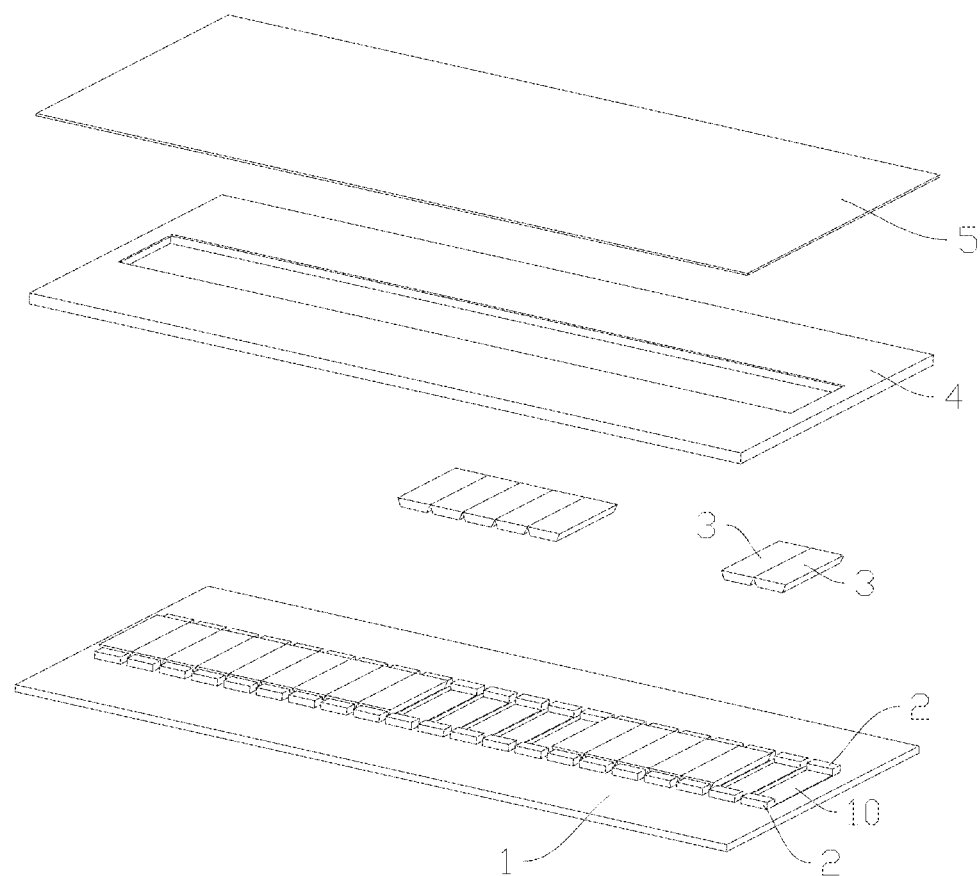
FIG. 1 is an exploded schematic diagram of the present disclosure.
Figure 2:
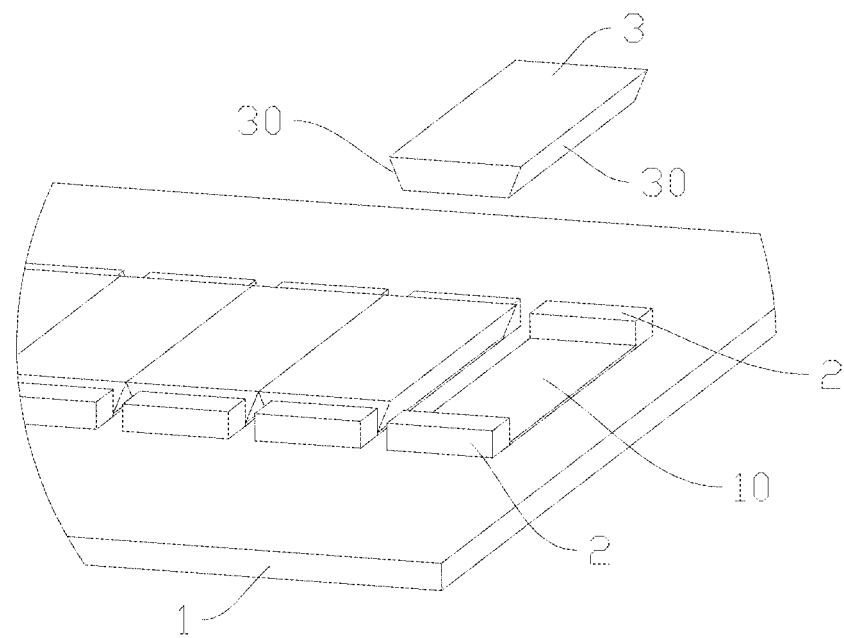
FIG. 2 is a schematic diagram of a light guide plate and a printed circuit board (PCB) of the present disclosure.
Figure 3:
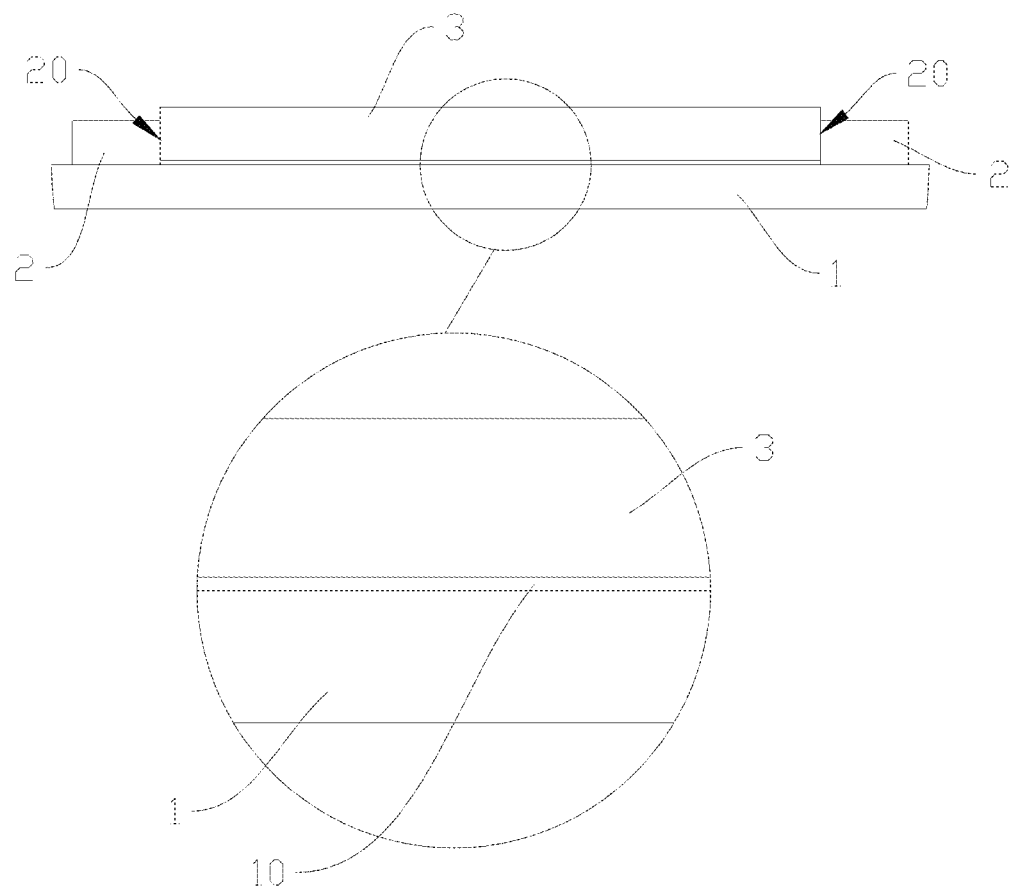
FIG. 3 is a schematic diagram of light emitting diode (LED) lamps and a light guide plate of the present disclosure.

As shown in FIGS. 1-3, a touch pad structure capable of displaying patterns is disclosed in the present disclosure. The touch pad structure includes: a printed circuit board (PCB) 1, where a touch assembly 10 is arranged on a top surface of the PCB 1, and the touch assembly 10 is electrically connected to an internal circuit of the PCB 1. Light emitting diode (LED) lamps 2 are arranged on the top surface of the PCB 1, and the LED lamps 2 are electrically connected to the internal circuit of the PCB 1.

The touch assembly 10 is of a capacitive touch module or a resistive touch module. When the capacitive touch module is employed, the capacitive touch module may be a conductive sheet, such as a conductive film sheet made of copper foil, aluminum foil, silver foil or a conventional composite material.

As shown in FIGS. 1-3, the touch assembly 10 is of a copper foil structure, where the copper foil is arranged on the top surface of the PCB 1 (the copper foil is coated with colored solder resist to form an insulating layer, such as green oil or other colored solder resist), and the copper foil is electrically connected to the internal circuit of the PCB 1.

Specifically, as shown in FIGS. 1-3, two sets of LED lamps 2 are arranged at a first end and a second end of the touch assembly 10 respectively and form a set of controllable light sources, and the first end is opposite to the second end. A plurality of LED beads can be arranged in each set of LED lamps.

As shown in FIG. 3, in the set of controllable light sources, light guide plates 3 are arranged between the two sets of LED lamps 2, and the light guide plates 3 are arranged on an upper side of the touch assembly 10 in a closely attached manner. The two sets of LED lamps 2 are provided with light emitting surfaces 20 facing the light guide plates 3, forward lighting or side lighting or simultaneous use of forward lighting and side lighting may be performed. For the forward lighting structure: part of the light guide plate 3 covers the LED lamps.

It should be pointed out that the LED lamp can be composed of monochromatic lamp beads or multicolor lamp beads to form a monochromatic light source or a multicolor light source. The resistive touch module is a conventional resistive key module.

When a spacing between two adjacent light guide plates 3 is less than or equal to preset optical crosstalk spacing, the surface, facing the adjacent light guide plate 3, of each light guide plate 3 is an inclined surface 30, and a width of the inclined surface 30 is gradually reduced in a direction of the touch assembly 10.

In particular, the surface, facing the adjacent light guide plate 3, of each light guide plate 3 may also be a straight surface, and in this case, optical crosstalk prevention is realized through the blocking plate 6. Further, a diffusion sheet may be mounted on the light guide plate to increase uniformity of light.

Film paper 5 pasted/adhered to or is mounted an upper surface of the light guide plate 3 in a closely attached manner, and the film paper 5 is divided into three types. The first type is a color film, for example, touch patterns are printed on the film paper 5, the touch patterns can allow light to be transmitted, and the controllable light source lights the touch patterns, such that the patterns are selected by changing the brightness of the patterns. The second type is a semi-permeable film, for example, a touch pattern layer is formed on the film paper 5, in a non-lighting state, the whole pattern layer has the same color (black), and no pattern can be seen; and in a lighting state, the pattern is displayed in the color of the light source, and the color of the light source is different from that of the pattern layer. The third type is a full-permeable color film, and light transmittance of the full-permeable color film is higher than that of a common color film. The three types of film paper can be used in combination according to needs.

It should be pointed out that the optical crosstalk spacing refers to the minimum spacing, which is difficult to ignore in the backlight state, between two adjacent light guide plates 3, and this spacing is related to the brightness of the LED lamps 2, and the shape, size, thickness, material type, etc. of the light guide plate 3. Therefore, the optical crosstalk spacing needs to be set according to the actual situation. When the spacing between two adjacent light guide plates 3 is greater than the optical crosstalk spacing, optical crosstalk between the two adjacent light guide plates can be ignored.

When two adjacent light guide plates 3 are arranged in a closely attached manner, the inclined surface 30 is arranged on a side surface of the light guide plate 3, such that the cross section of the light guide plate 3 is in an inverted trapezoidal shape, the optical crosstalk between the adjacent light guide plates 3 can be effectively reduced, and the display effect and the hiding effect of the touch patterns can be thus improved.

It should be noted that, when the touch assembly 10 is of a copper foil structure, a user touches the touch pattern (the position of the touch pattern corresponds to the position of the copper foil) or a corresponding identifier (the position of the identifier corresponds to the position of the copper foil), an electric field at the copper foil will be changed. A micro-controller unit (MCU) executes corresponding actions by acquiring the change of an electric field signal, such as activation, inactivation and switching of a certain function, and finally backlight of the touch pattern can be turned on or off separately.

Further, the light guide plate 3 guides light of the LED lamp 2 into the touch pattern to realize backlight lighting. By configuring background color (i.e. the color of the touch assembly 10 on a lower side of the light guide plate 3 and the color of the PCB 1) of the light guide plate 3, and color of the film paper 5, the touch pattern can be integrated with an opaque portion of the film paper 5 in a non-backlight state to realize hiding.

Under strong light, since the background color of the light guide plate 3 is similar to the color of the opaque portion of the film paper 5, the technical solution of the present disclosure can also obtain a relatively good hiding effect.

When in use, the position of the touch pattern can correspond to the position of the touch assembly 10, and a single touch assembly 10 is equivalent to a single control key, so as to control lighting or extinguishing of each touch pattern independently. A text identifier can be printed on a lower side of the touch pattern, and the user can determine the position of the touch pattern through the identifier. When the user touches an upper portion of the text identifier, i.e., touching the touch pattern, the MCU will detect a corresponding signal and perform the corresponding lighting or extinguishing action.

Specifically, as shown in FIG. 1, a filler 4 is arranged between the film paper 5 and the PCB 1, and the filler 4 is of a plastic bracket or foam or any other insulating material. When the filler 4 is of the plastic bracket, the light guide plate 3 will be fixed in a limited manner, and when the filler 4 is the foam, a buffer function is provided.

Figure 4:
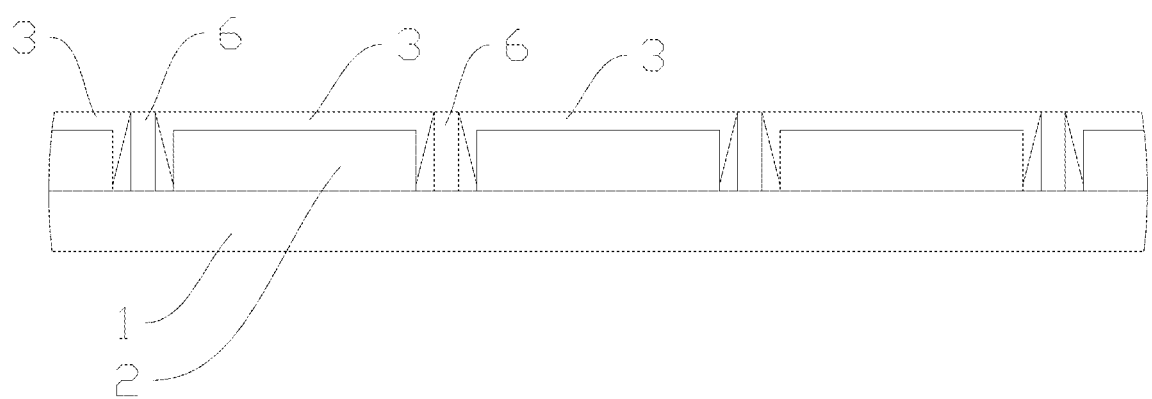
FIG. 4 is a schematic diagram of the present disclosure with a blocking plate.

Specifically, as shown in FIG. 4, in the case that two adjacent light guide plates 3 are arranged in a spaced manner, when the spacing between two adjacent light guide plates 3 is less than or equal to a preset optical crosstalk spacing, a blocking plate 6 is arranged between the two adjacent light guide plates 3, and the blocking plate 6 is used for preventing optical crosstalk.

Further, when the spacing between the two adjacent light guide plates 3 is less than or equal to the preset optical crosstalk spacing, a shielding layer or a reflective layer is arranged on the surface, facing the adjacent light guide plate 3, of each light guide plate 3. This structure is most used in the case that two light guide plates 3 are arranged in a closely attached manner. The shielding layer or the reflective layer can be a wrapping formed by opaque/reflective materials or a coating formed by painting opaque/reflective paint. In combination with the inclined surface 30, this structure is capable of achieving a better optical crosstalk prevention effect and reducing influence of optical crosstalk on the hiding effect of the touch pattern.

Figure 5:
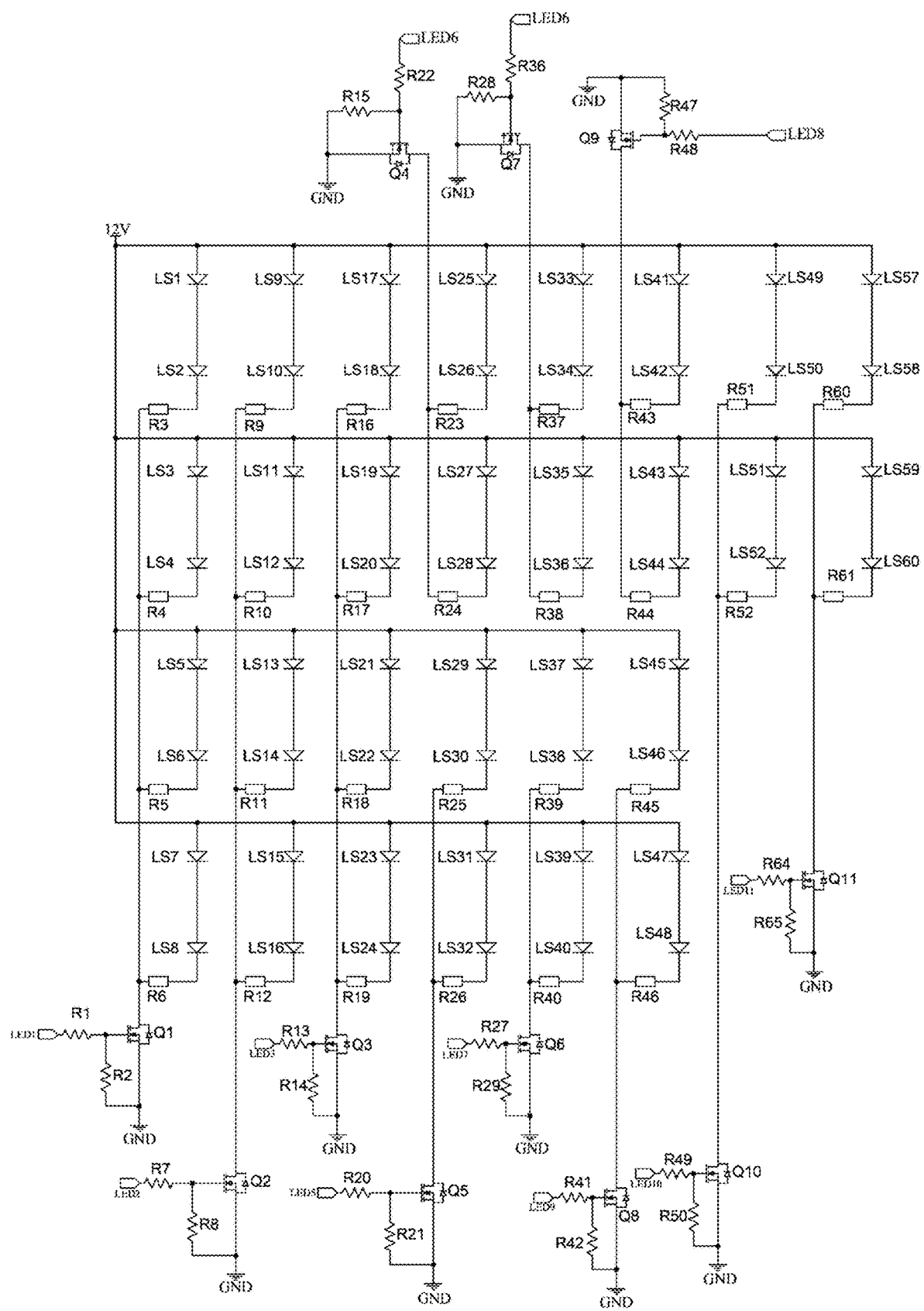
FIG. 5 is a schematic diagram of LED lamps of the present disclosure.

As shown in FIG. 5, anodes of a plurality of sets of LED lamps are electrically connected to a +12v power supply terminal, and cathodes of each set of LED lamps are electrically connected to an on-off control circuit (composed of metal oxide semiconductor (MOS) tubes and resistors). Grids of the MOS tubes are electrically connected to the MCU, sources are grounded, and drains are connected to output cathodes of a single set of LED lamps. For example, MOS tubes Q1 and Q2 are used for controlling two sets of LED lamps opposite each other in a single set of controllable light sources, similarly, Q3, Q10, Q4, Q5, Q6, Q7, Q8, Q9, and Q11 may be control MOS tubes for indicating LED lamps, and each set of LED lamps are provided with 8 or 4 LED lamp beads.

Figure 6:
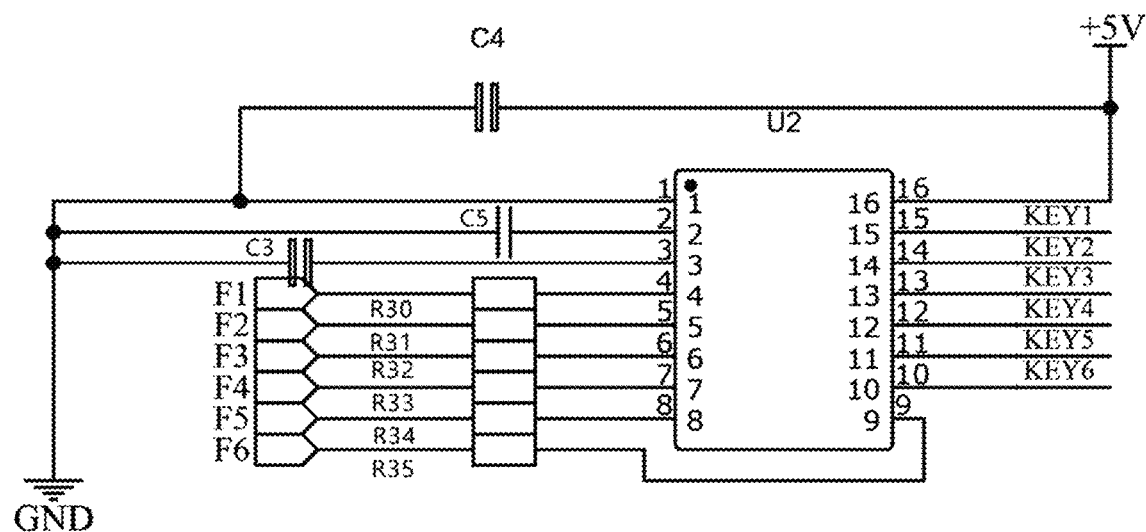
FIG. 6 is a schematic diagram of a first capacitive touch chip of copper foil of the present disclosure.

Referring to FIG. 6, U2 is a capacitive touch chip, which is used for converting an electric field change signal of the copper foil into a readable signal of MCU, and pins of which include F1-F6 (corresponding to the copper foil) and KEY1-KEY6 (electrically connected to the MCU terminal). High/low level signals output by KEY1-KEY6 correspond to trigger control of MOS tubes Q1-Q6 in FIG. 5. Further, since there are a plurality of sets of LED lamps, there are two capacitive touch chips, and the schematic diagram of the other one is the same as that of the chip U2. However, the pin numbers are different, and the pins are pins F7-F11 and pins KEY7-KEY11, as shown in a chip U3 of FIG. 7.

Figure 7:
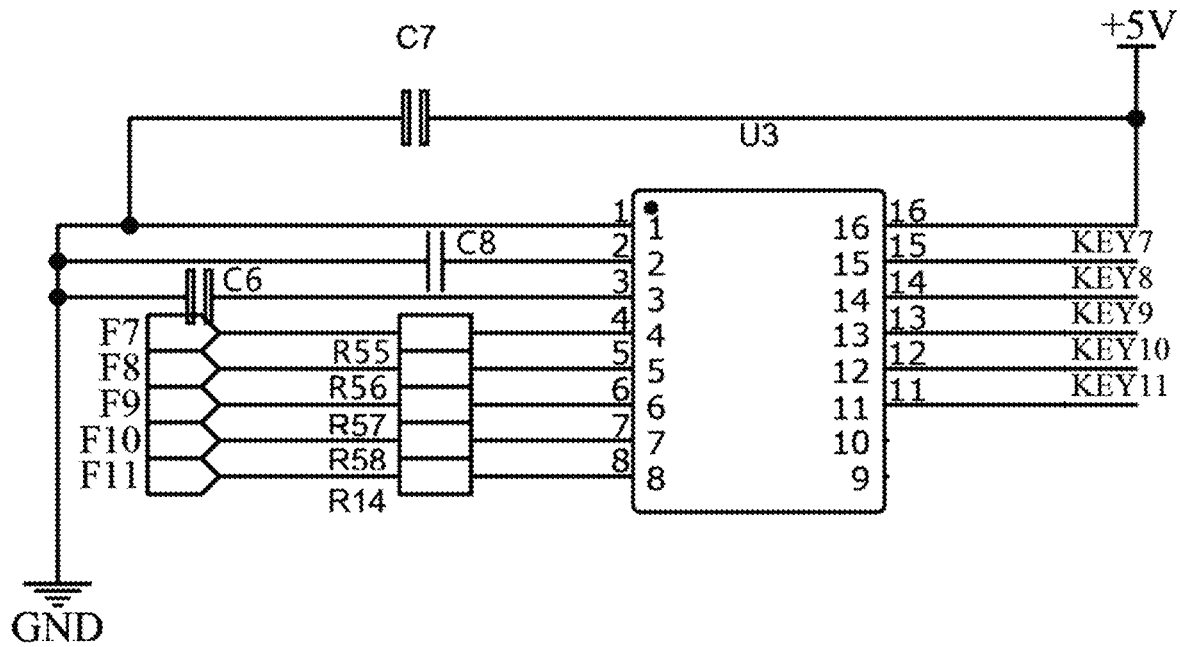
FIG. 7 is a schematic diagram of a second capacitive touch chip of copper foil of the present disclosure.
Figure 8:
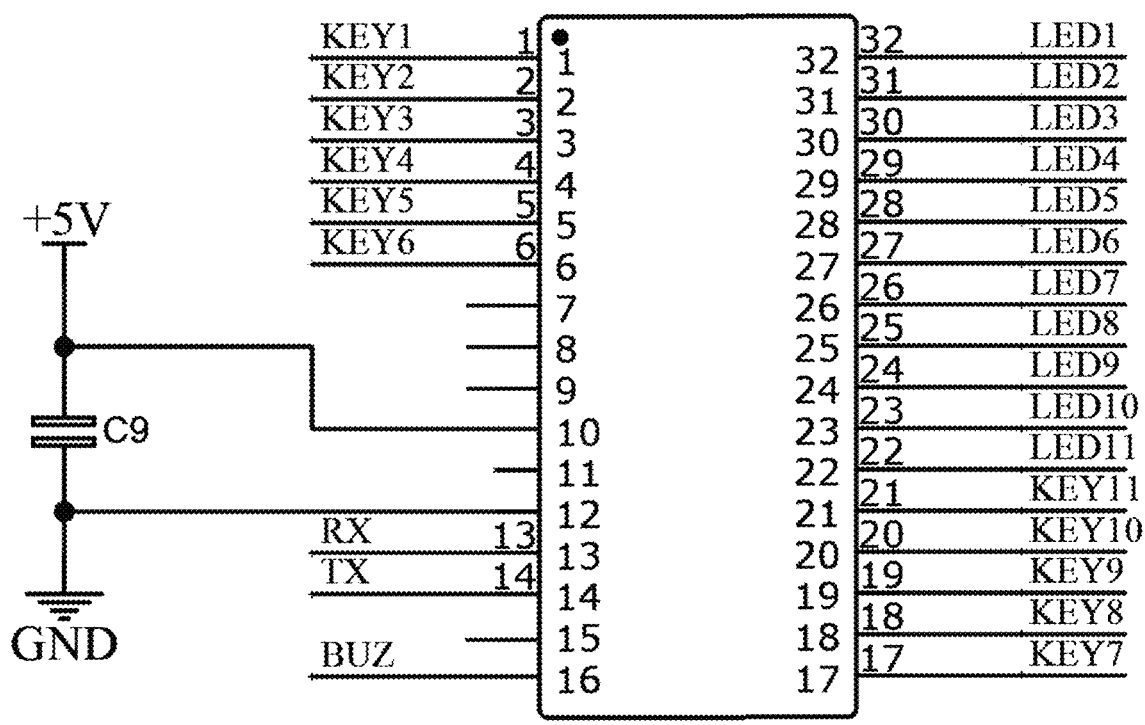
FIG. 8 is a schematic diagram of a micro-controller unit (MCU) of the present disclosure.

As shown in FIG. 8, U4 is the MCU, two sets of pins of MCU are electrically connected to the capacitive touch chips (U2 and U3) in FIG. 6 and FIG. 7 and the gates of the MOS tubes Q1-Q11 in FIG. 5 respectively, so as to realize circuit control.

It can be seen that the solution used in the circuit control of the present disclosure is simpler than the traditional serial peripheral interface (SPI) communication solution.

To sum up, the capacitive or resistive touch module is selected according to needs, so as to flexibly deploy the touch assembly. The capacitive touch module is configured with the copper foil, when in use, the user touches the touch pattern, the electric field at the copper foil will be changed, and the MCU executes corresponding actions by acquiring the change of the electric field signal, such as activation, inactivation and switching of the certain function. Each piece of copper foil is equivalent to a key, and finally backlight of the touch pattern can be turned on or off separately. This monitoring and control process does not require configuration of additional driver chips or driver circuits, which is simpler and more cost-effective than conventional screen driving.

In terms of structure, compared with the conventional screen, the touch pad structure can be made thinner. By configuring the background color of the light guide plate and the color of the film paper (semi-permeable film), all the touch patterns can be hidden in the non-backlight state (an identification text corresponding to the copper foil position is not hidden). In the backlight state, only the corresponding touch pattern is lit up, and other touch patterns are still in the hidden state, so as to improve a recognition degree of the user to the currently displayed touch pattern in a strong lighting environment.

Further, the inclined surface cooperates with the blocking plate, the shielding layer or the reflective layer to further reduce the optical crosstalk between the adjacent light guide plates, and improve a display effect and a hiding effect of the touch patterns.

In the description of the present disclosure, it is to be noted that orientation or position relations indicated by the terms "central", "upper", "lower", "left", "right", "vertical", "horizontal", "inner", "outer", etc. are based on orientation or position relations shown in the accompanying drawings, and are merely for facilitating the description of the present disclosure and simplifying the description, rather than indicating or implying the device or element referred to must have a specific orientation or be constructed and operated in a specific orientation, and therefore will not be interpreted as limiting the present disclosure. In addition, the terms "first" and "second" are merely for description and may not be understood as indication or implication of relative importance. The terms "first position" and "second position" are two different positions.

The embodiments mentioned above are merely one or more embodiments of the present disclosure, and are specifically described in details, but may not be interpreted as limiting the scope of the patent for the present disclosure as a result. It should be noted that for those of ordinary skill in the field, they may also make several transformations and improvements on the premise of not deviating from the conception of the present disclosure, and these transformations and improvements shall fall within the protection scope of the present disclosure. Hence, the protection scope of the present disclosure shall be subject to the appended claims.

What is claimed is:

1. A touch pad structure capable of displaying patterns, comprising: a printed circuit board (PCB), wherein a touch assembly is arranged on a top surface of the PCB, the touch assembly is electrically connected to an internal circuit of the PCB, light emitting diode (LED) lamps are arranged on the top surface of the PCB, the LED lamps are electrically connected to internal circuits of the PCB, and the touch assembly is of a capacitive touch module or a resistive touch module;

two sets of LED lamps are arranged at a first end and a second end of the touch assembly respectively and form a set of controllable light sources, and the first end is opposite to the second end;

in the set of controllable light sources, light guide plates are arranged between the two sets of LED lamps, the light guide plates are arranged on an upper side of the touch assembly, and the two sets of LED lamps are provided with light emitting surfaces facing the light guide plates and performing forward lighting or side lighting;

when a spacing between two adjacent light guide plates is less than or equal to preset optical crosstalk spacing, the surface, facing the adjacent light guide plate, of each light guide plate is an inclined surface, and the inclined surface gradually narrows towards the direction of the touch assembly; and film paper is mounted on an upper surface of the light guide plate.

2. The touch pad structure capable of displaying patterns according to claim 1, wherein a filler is arranged between the film paper and the PCB, and the filler is of a plastic bracket or foam.

3. The touch pad structure capable of displaying patterns according to claim 2, wherein the filler is of the plastic bracket and fixes the light guide plate in a limited manner.

4. The touch pad structure capable of displaying patterns according to claim 1, wherein when the spacing between two adjacent light guide plates is less than or equal to the preset optical crosstalk spacing, a blocking plate is arranged between the two adjacent light guide plates, and the blocking plate is used for preventing optical crosstalk.

5. The touch pad structure capable of displaying patterns according to claim 1, wherein when the spacing between two adjacent light guide plates is less than or equal to the preset optical crosstalk spacing, a shielding layer or a reflective layer is arranged on the surface, facing the adjacent light guide plate, of each light guide plate.

6. The touch pad structure capable of displaying patterns according to claim 1, wherein the film paper pasted/adhered to an upper surface of the light guide plate, and the film paper is any one or combination of a semi-permeable film, a color film and a full-permeable color film.

7. The touch pad structure capable of displaying patterns according to claim 1, wherein a diffusion sheet is mounted on the light guide plate.

8. The touch pad structure capable of displaying patterns according to claim 1, wherein the capacitive touch module is of a conductive sheet.

9. The touch pad structure capable of displaying patterns according to claim 1, wherein the capacitive touch module is of a copper foil structure.

* * * * *